Patented July 5, 1949

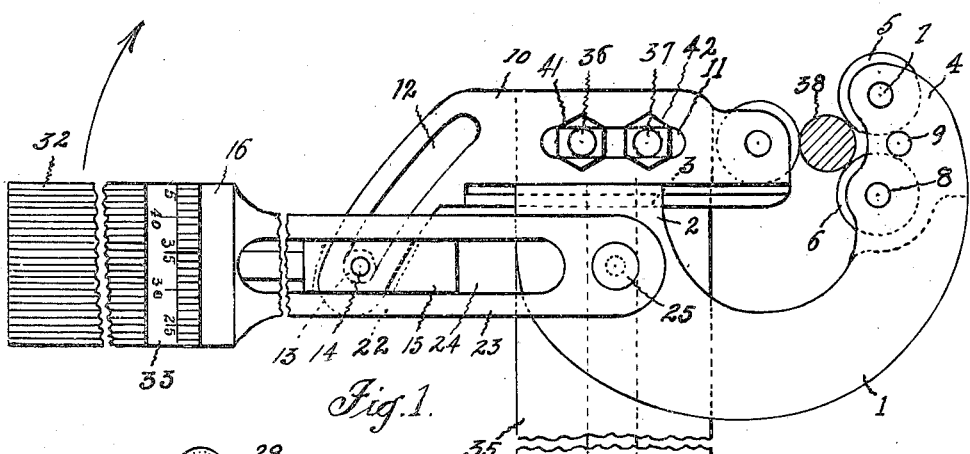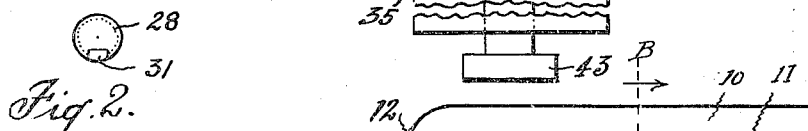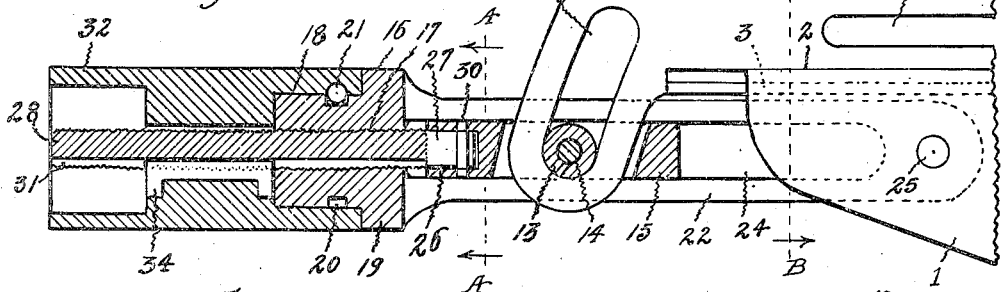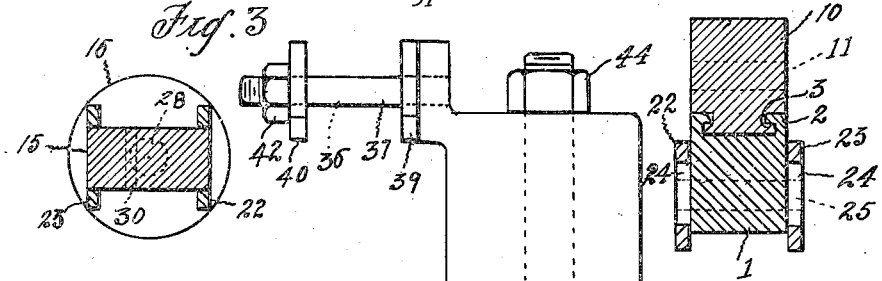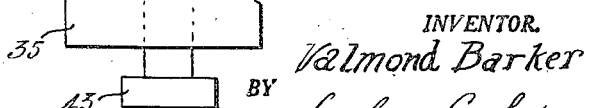

2,475,216

UNITED STATES PATENT OFFICE 2,475,216

KNURLING TOOL

Valmond Barker, Cleveland, Ohio

Application May 19, 1947, Serial No. 749,053

1 Claim. (Cl. 80—5.1)

This invention relates to a knurling tool, and particularly to a tool adapted to be mounted on and supported on a fixture mounted and secured on the compound rest assembly of a lathe or analogous machine, and the main object is to provide a simple and efficient tool capable of producing a knurl on the surface of work held in and rotated by the chuck of a lathe.

The depth of the knurl may be varied by means of an adjusting screw operatively connected with a thrust block, the movement of which moves a knurl carrying member toward and from the periphery of the material being knurled. The exact depth of the knurl may be predetermined from the circumferential scale provided on the tool.

For the purpose of aiding in the explanation of the invention I show in the accompanying drawing and hereinafter describe one practical embodiment of it. It is to be understood, however, that this embodiment is presented merely by way of illustration and that the specific showing and description of it are not to be construed in any fashion as limiting the appended claim short of the true and comprehensive scope of the invention in the art. There are of course numerous methods of performing the mechanical features of my invention of which I have shown but one.

Figure 1 shows the knurling tool in side elevation, mounted on the fixture, and in operative position on a piece of material to be knurled.

Figure 2 is an end view of the adjusting screw illustrating the location of the longitudinally extending groove therein.

Figure 3 is an enlarged fragmentary sectional view, and illustrating the adjusting mechanism.

Figure 4 is a cross sectional view on line A—A in Figure 3.

Figure 5 is a cross sectional view on line B—B in Figure 3.

Figure 6 is a view in side elevation of the fixture alone.

Similar numerals refer to similar parts throughout the several views.

As illustrated, this device comprises a jaw 1 of suitable configuration, and made of material such as hardened steel. Its inner extremity 2 is provided with a lengthwise extending guideway 3. Its outer arm 4 is provided with removably mounted knurls 5 and 6, rotatably mounted on spindles 7 and 8. However, a single knurl may be used, if desired, by removing the knurls and mounting one of them in the outer arm, using the through bore 9 which is machined to interchangeably receive either of the spindles, so that only two knurls may be used in place of three as illustrated in Figure 1.

The adjustable knurl-supporting member 10 is mounted on the inner extremity in the guide-way, and is provided with a lengthwise extending elongated through opening 11 its purpose being hereinafter explained. The aforesaid member is also provided with an arcuate slot 12 for the reception of a thrust roller 13 which is rotatably mounted on the thrust roller pin 14 in the thrust block 15.

The nut 16 is provided with an internally lengthwise extending threaded bore 17, a reduced cylindrical portion 18 and a flange 19. In the reduced cylindrical portion there is provided an annular groove 20 adapted to receive the tangential pin 21. Welded to or otherwise connected with the nut there is provided two longitudinally extending members 22 and 23 in each of which there is provided a lengthwise extending slot as at 24 in which the thrust block 15 is slidably guided and adjustably mounted.

The members 22 and 23 are pivotally mounted on the jaw by means of a spindle 25.

In the thrust block there is provided a smooth bore 26 for the reception of the end portion 27 of the adjusting screw 28 which is provided with an annular groove 29 for the reception of the tangential pin 30 adapted to hold the adjusting screw in operative position therein. The adjusting screw threadedly engages in the lengthwise extending threaded bore in the nut and is provided with a lengthwise extending groove 31.

On the nut there is mounted a rotatable adjusting member 32 that is held in operative relationship thereon by means of the tangential pin 21. On the adjusting member there is provided a circumferential scale 33 by means of which the depth of the knurl may be predetermined. In the adjusting member there is provided a key 34 that engages in the lengthwise extending groove 31 formed in the adjusting screw and by means of which it is turned in the nut, and when turned moves the thrust block forward or back to vary the relief of the knurl.

The knurling tool is mounted on the fixture or support 35 which is provided with two spaced studs 36 and 37 which pass through the elongated lengthwise extending opening 11. It will be noted that the knurling tool may be moved forward and back on the studs, because their spacing is less than the length of the opening. The freedom of movement on the studs is necessary so that knurls may be freed from the material 38 being knurled as shown in Figure 1. Washers 39 and 40 may be employed to space and to assist in holding the tool in spaced relationship on the fixture or support when mounted on the studs and the nuts 41 and 42 are screwed thereon. The fixture is held in predetermined position on the compound rest assembly by means of the bolt 43 and the nut 44.

The operation of the device is as follows:

The material to be knurled is chucked in the lathe. The fixture is then mounted and properly positioned on the compound rest assembly and secured thereon. The tool is then mounted on the fixture so that it may be opened, that is by swinging up the portion that is pivotally mounted on the jaw, as indicated by the arrow in Figure 1. It is to be understood that tool is adjusted to the diameter of the material to be knurled, so that when the tool is closed as shown in Figure 1 the knurls are in contact with the periphery thereof. If it is desired to produce a knurl of a certain depth, the depth may be determined by means of the circumferential scale. When the tool is closed as shown in Figure 1, the arcuate slot in cooperation with the roller acts as a cam to force the ribs of the knurls into the metal. If the knurl is overly deep, it may require several settings to accomplish the desired result.

It will be understood by those skilled in the art that the structures illustrated may be modified in many details without departure from the spirit of the invention as claimed.

Having thus described my invention what I claim as new and desire to secure by Letters Patent is:

A knurling tool, comprising, in combination a jaw consisting of an inner arm having a guide-way therein, an outer arm, a pair of removably mounted knurling wheels in the outer arm, a slidably mounted knurl carrying member having formed therein a lengthwise extending through slot adapted to receive studs on a fixture support, and an arcuate slot, mounted in the guide-way in the inner arm, a removably mounted knurl in the aforesaid knurl carrying member, a nut having therein a lengthwise extending threaded bore, and connected to the nut two lengthwise extending members each having a through longitudinally extending slot therein and pivotally mounted on the jaw member, a thrust block slidably and adjustably mounted in the lengthwise extending slots, an adjusting screw having a lengthwise extending groove therein operatively connected to the thrust block and engaging the threaded bore in the nut, a roller mounted in the arcuate slot in the knurl carrying member and held in operative position in the thrust block by a pin, a rotatable adjusting member having a circumferential scale on the periphery thereof mounted on the nut and held in operative position thereon by a tangential pin engaging in a groove provided in the nut therefor, a key in the aforementioned adjusting means adapted to engage in the lengthwise extending groove in the adjusting screw and adapted to turn the aforesaid screw in the nut to move and thrust block with its cooperating knurl carrying member back and forth in producing the depth of the knurl.

VALMOND BARKER.

No references cited.